No. 823,880. PATENTED JUNE 19, 1906.
W. E. KOCH.
CORN HARVESTER.
APPLICATION FILED DEC. 23, 1905.
3 SHEETS—SHEET 1.
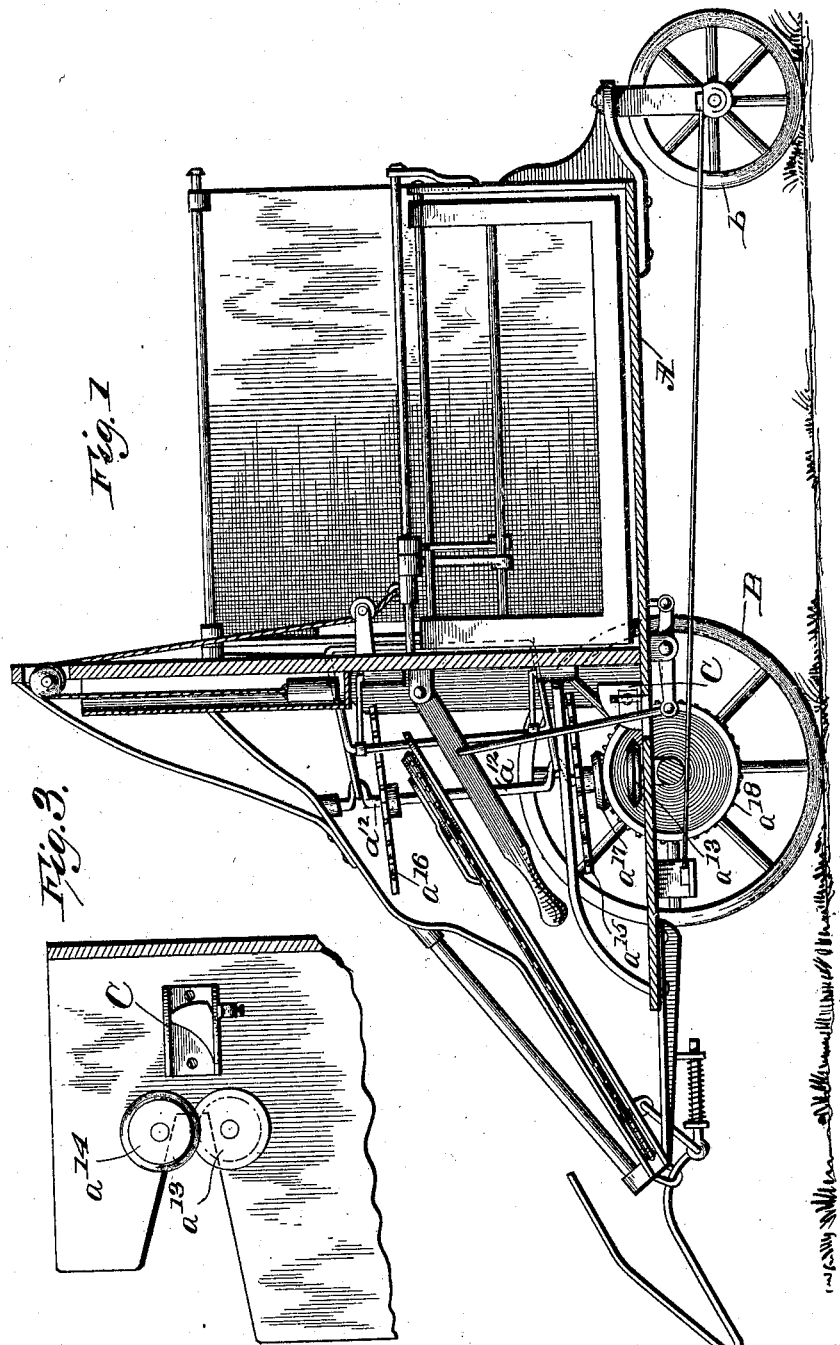
WITNESSES:
C. M. Callaghan
C. E. Trainor
INVENTOR
WILLIAM E. KOCH
BY Munn & Co.
ATTORNEYS

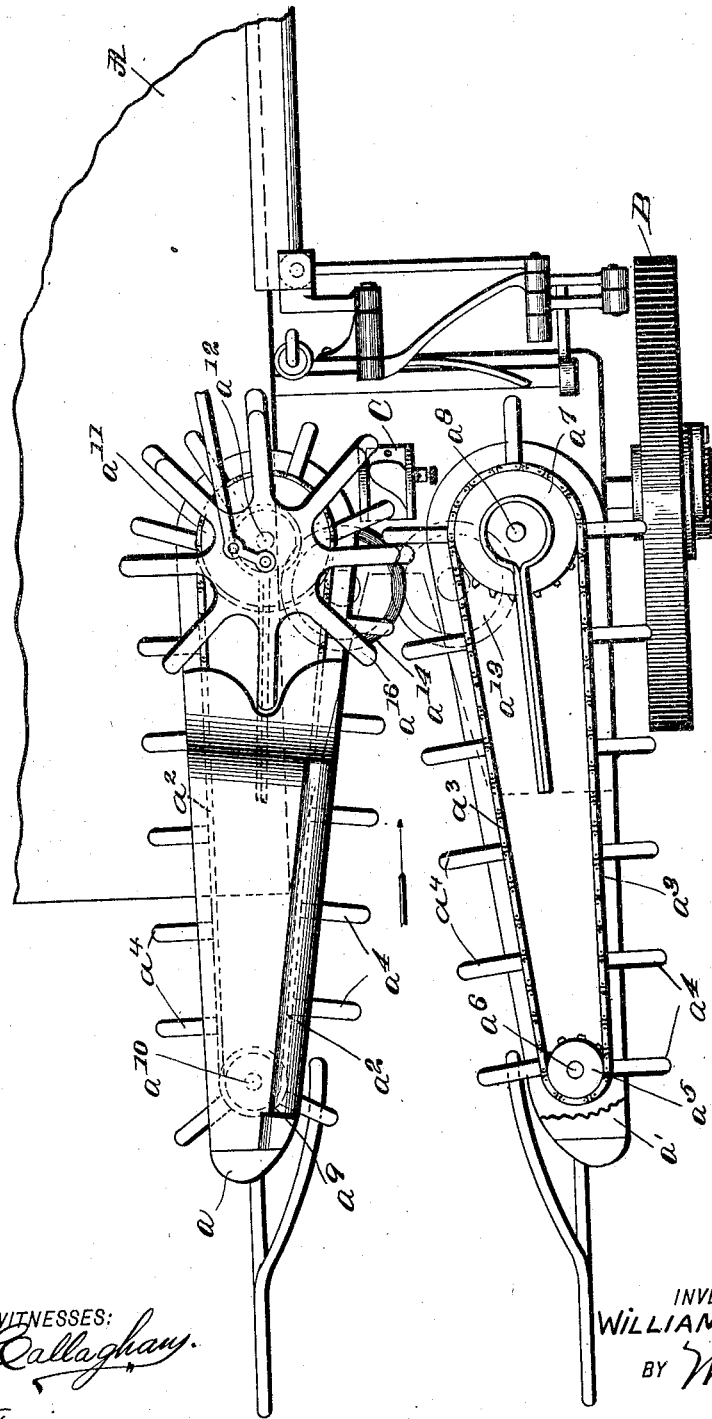

No. 823,880. PATENTED JUNE 19, 1906.
W. E. KOCH.
CORN HARVESTER.
APPLICATION FILED DEC. 23, 1905.
3 SHEETS—SHEET 3.
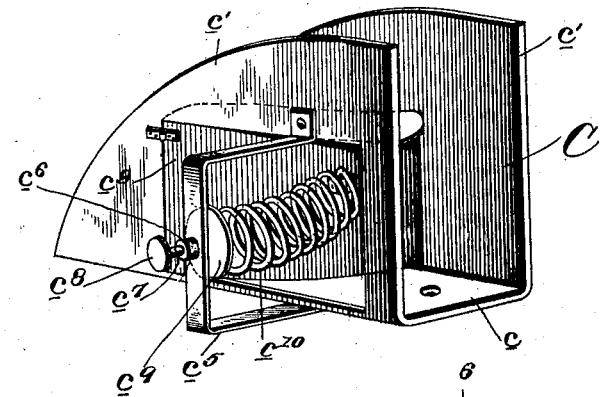
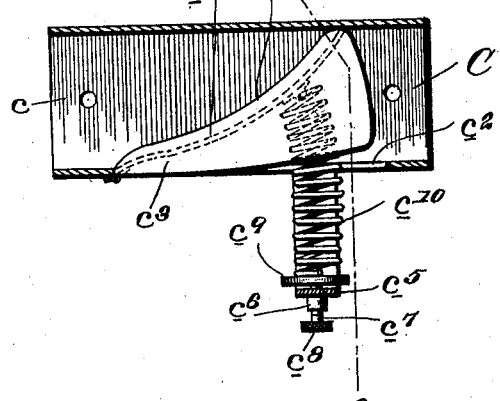
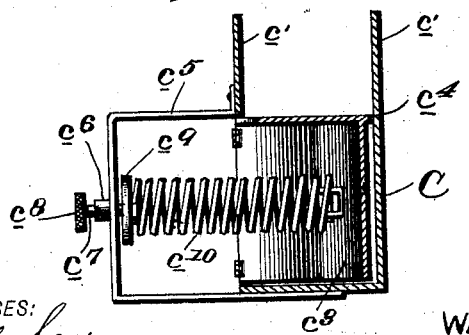
INVENTOR
WILLIAM E. KOCH

UNITED STATES PATENT OFFICE.

WILLIAM E. KOCH, OF DUVALL, OHIO.

CORN-HARVESTER.

No. 823,880. Specification of Letters Patent. Patented June 19, 1906.

Application filed December 23, 1905. Serial No. 293,100.

*To all whom it may concern:*

Be it known that I, WILLIAM E. KOCH, a citizen of the United States, and a resident of Duvall, in the county of Pickaway and State of Ohio, have invented certain new and useful Improvements in Corn - Harvesters, of which the following is a specification.

My invention is an improvement in corn-harvesters; and it consists in certain novel constructions and combinations of parts hereinafter described and claimed.

Referring to the drawings forming a part hereof, Figure 1 is a central vertical section of a corn-harvester supplied with my improvements. Fig. 2 is a plan view of a part thereof, showing the arrangement of my improvement with reference to the conveyer-chains. Fig. 3 is a detail of Fig. 2. Fig. 4 is a perspective view of my improvement separated from the remainder of the machine. Fig. 5 is a top plan view thereof, and Fig. 6 is a section on the line 6 6 of Fig. 5.

My present invention is an improvement on my prior patent, No. 720,444, of February 10, 1903, and is designed to overcome the difficulties presented by leaning stalks.

While I have shown my improvement as applied to the type of harvester shown and described in the above-named patent, it is obvious that it might with equal facility be applied to any similar type of harvester.

In the harvester illustrated in the drawings the frame A is supported by the power-wheels B and the grain-wheel $b$. Dividing-boards $a$ $a'$ are provided at the front of the machine at each side thereof, and upon the dividing - boards are supported conveyer-chains $a^2$ $a^3$, provided with the projecting lugs or fingers $a^4$. The chain $a^3$ is supported by a sprocket-wheel $a^5$, journaled upon a stud-shaft $a^6$, and a sprocket-wheel $a^7$, journaled upon a stud-shaft $a^8$, driven in any suitable manner from the power-wheel B. The chain $a^2$ is supported at one end by a sprocket-wheel $a^9$, journaled upon a stud-shaft $a^{10}$, and at the other end by a sprocket-wheel $a^{11}$, journaled upon a shaft $a^{12}$, having at either end above and below the conveyer-chain star-wheels $a^{16}$ $a^{15}$.

Upon the frame and below the conveyer-chains are journaled cutter-wheels $a^{13}$ $a^{14}$, the edges of the wheels being beveled and coacting with each other, the coacting cutting edges of the wheels contacting at the intersection of the fingers of the conveyer-chains. The shaft $a^{12}$ is provided at its lower end with a bevel-gear $a^{17}$, meshing with a bevel-gear $a^{18}$ upon the shaft of the supporting-wheels B.

My improvement is arranged immediately behind the intersection of the cutting edges of the cutters and comprises a check C, composed of a bracket $c$, having upstanding sides $c'$, one of which is provided with an opening $c^2$. A curved stop $c^3$ is hinged within the opening, the upper edge of the stop being provided with a flange $c^4$, projecting beyond the face of the stop. Upon the outer face of the upstanding side provided with the opening is arranged a yoke $c^5$, having within the body portion thereof a screw-threaded nipple $c^6$, traversed by a screw-threaded pin $c^7$, having upon the outer end thereof a thumb-nut $c^8$ and upon the inner end a disk $c^9$. A spring $c^{10}$ is arranged between the stop-plate and the disk, one end of the spring being secured to the plate and the other to the disk. By turning the thumb-nut $c^8$ the tension of the spring may be regulated. The stop-plate in normal position closes the space between the upstanding sides of the bracket in such manner as to check the butts of the stalks of corn after their passage through the cutters, the flange preventing the slipping of the butts of the stalks above the plate.

In operation when a leaning stalk is encountered it is engaged by the conveyer-chains, which have a tendency to lift it to an erect position. When severed by the cutters, the butt of the stalk slips back into the check, which retains it until the conveyer-chains lift the upper end thereof into a position where it may be engaged by the upper star-wheels. The star-wheels engage the stalk at its upper and its lower end, forcing the butt thereof past the stop-plate, the spring of which yields to allow its passage.

Having thus described my invention, what I claim as new, and desire to secure by Letters Patent, is—

1. In a corn-harvester, the combination with the frame, of conveyer-chains on the frame for engaging the stalks, a cutter on the frame at the rear of the conveyer-chains, star-wheels for receiving the stalks from the conveyer-chains, and a check for the butts of the stalks, comprising a bracket secured to the frame behind the cutter, and provided with upstanding sides, a stop hinged to one of the sides and comprising a curved vertical plate normally extending between the sides of the bracket, the plate having upon its upper edge a flange, a spring for maintaining the stop in position, and means for regulating the tension of the spring.

2. In a corn-harvester, the combination with the frame, of conveyer-chains on the frame for engaging the stalks, a cutter on the frame at the rear of the conveyer-chains, star-wheels for receiving the stalks from the conveyer-chains, and a check for the butts of the stalks comprising a bracket having upstanding sides, a curved vertical plate hinged to one side of the bracket, the plate having a flange on its upper edge, and means for yieldingly maintaining the plate in position across the bracket.

3. In a corn-harvester, the combination with the frame, of conveyer-chains on the frame for engaging the stalks, a cutter for receiving the stalks, star-wheels for receiving the stalks from the conveyer-chains, and a check for the butts of the stalks, comprising a spring-pressed plate normally extending across the path of travel thereof.

4. In a corn-harvester, the combination with the frame having a cutter thereon, of means for straightening the leaning stalks, comprising conveyer-chains for engaging the tops thereof, a spring-pressed stop for engaging the butts of the stalks, and means for engaging the tops and bottoms of the stalks at the rear of the conveyer-chains to force the stalks beyond the stop.

5. In a corn-harvester, the combination with the frame having a cutter thereon, of means for raising the stalks into a perpendicular position, comprising conveyer-chains for elevating the upper end thereof, and a spring-pressed stop for engaging the butt of the stalk.

6. In a corn-harvester the combination with the frame having a cutter thereon, of means for straightening the leaning stalks, comprising means for engaging the top of the stalk, and a yielding stop for engaging the butt of the stalk.

WILLIAM E. KOCH.

Witnesses:
W. H. REID,
A. E. OMAN.